(No Model.)

S. S. BABBITT & R. W. BAILEY.
BEARING FOR ENGINES.

No. 456,921. Patented July 28, 1891.

WITNESSES:
W. B. Corwin
Jno. K. Smith

INVENTORS
Seward S. Babbitt
Reade W. Bailey
BY
W. Bakewell & Son
their ATTORNEYS

UNITED STATES PATENT OFFICE.

SEWARD S. BABBITT, OF ALLEGHENY, AND READE W. BAILEY, OF PITTSBURG, ASSIGNORS TO SAID BABBITT AND THE ROBINSON-REA MANUFACTURING COMPANY, OF PITTSBURG, PENNSYLVANIA.

BEARING FOR ENGINES.

SPECIFICATION forming part of Letters Patent No. 456,921, dated July 28, 1891.

Application filed July 25, 1889. Serial No. 318,648. (No model.)

*To all whom it may concern:*

Be it known that we, SEWARD S. BABBITT, of Allegheny, and READE W. BAILEY, of Pittsburg, both in the county of Allegheny and State of Pennsylvania, have invented a new and useful Improvement in Main Bearings for Steam-Engines, of which the following is a full, clear, and exact description.

The object of our improvement is to provide a movable and adjustable bearing for engine-shafts by means of which a perfect and full bearing of a shaft or journal may be obtained, even when the journal-boxes may be out of alignment, owing to the wearing of the bearings, the settlement of the foundation, or from other cause or causes.

The accompanying drawings illustrate our invention.

Figure 2:
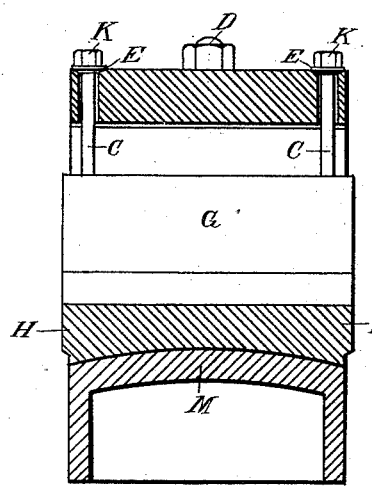
Figure 1:
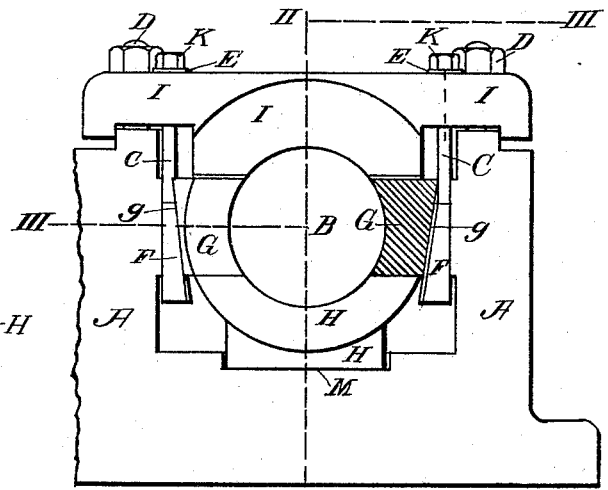
Figure 4:
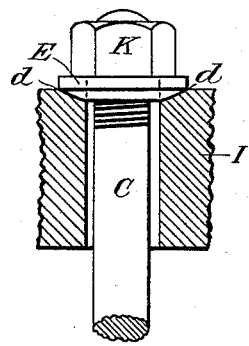
Figure 3:
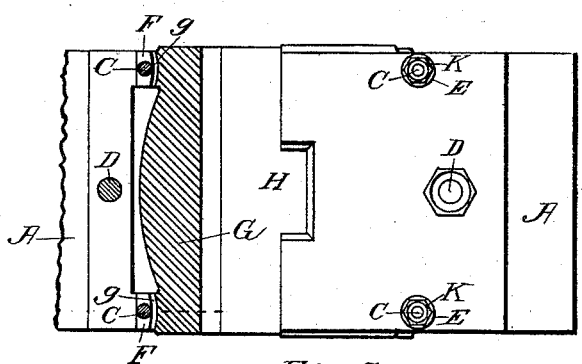

Figure 1 is a front view of the bearing at right angles to the axis of the shaft. Fig. 2 is a vertical cross-section on the line II II of Fig. 1. Fig. 3 is a plan view, partly in section, on the line III III of Fig. 1. Fig. 4 is an enlarged representation of one of the adjusting-screws.

In the several figures like letters of reference are used.

In the drawings, A is the housing or frame carrying the shafting or rolls, which are supported in the bearings.

B is the circular space formed by the bearings for the reception of the shaft or journal.

I is the cap-piece of the housing or frame A, secured in place by the screws D.

The bearing is a "quarter-bearing" composed of four pieces—the lower or main bearing H, two cheek-pieces G G, one on each side, and a top bearing I. The inner face or contour of each of these pieces is curved, being the arc of a circle having a radius equal to the semi-diameter of the shaft or journal. The lower or main bearing H has its outer and under surface curved longitudinally or in a vertical plane parallel to the axis of the bearing, as shown in Fig. 2. The main bearing H, having the under face curved as described, rests upon a foundation or base M, which forms part of the frame A, the upper surface of which base M is curved longitudinally, as shown in Fig. 2, the curvature corresponding in degree with the curve of the under side of the main bearing H. These curved surfaces of the bearing and base being sufficiently smooth to permit of one surface moving easily over the other in either direction, it is manifest that if the shaft or journal changes its alignment or bearing the main bearing will readily become adjusted to such change. When any such change of alignment of the main bearing H occurs, it becomes necessary to adjust correspondingly the cheek-pieces G G, which form the side bearings. The cheek-pieces G G are similar in shape. The inner face of each is curved, as before stated, the radius of curvature being also the radius of the journal of which these pieces constitute the bearing. At each end of each cheek-piece the outer face is inclined downward in a vertical direction, so that the cheek-pieces are wider at top than bottom, as seen in Fig. 1. These inclined surfaces *g g* are curved slightly in one direction, the radius of such curvature being in a horizontal plane, while in the other direction, or up and down, the surface is straight. At each end of each cheek-piece G is placed a wedge F, the face of which is curved to correspond with the curvature of the cheek-piece at that point, already described. These wedges have their narrowest end upward, and they are attached at their upper end to, or may be made in one piece with, a rod C, the upper end of which is furnished with a screw-thread, as shown in Fig. 4. These rods C extend upward through the cap-piece I through a bore or space larger than the diameter of the rod, so as to permit of some lateral motion. The upper surface of the upper bearing I of the frame is cupped, as shown at *d*, Fig. 4, so as to receive a washer E, the under side of which is curved, so that when the nut K is screwed down on the rod C, in order to raise the wedge F, the nut K has a square bearing, and the rod C and wedges F will not be strained by reason of the frame A or bearings being out of level or of alignment.

The top bearing I has a flat upper surface, forming in fact the cap-piece of the frame A, to which it is secured by the bolts D in the usual manner.

It will be noticed that the lower or main bearing-piece H lies loosely upon its bed M, so that it may move with the shaft or journal in case the cheek-pieces G G be not closely adjusted, and yet is sufficiently kept in place by the cheek-pieces and top piece to afford a firm bearing. This arrangement and construction gives a full bearing-surface for the shaft or journal, no matter what its alignment may be, while the freedom of the lower or main bearing H to accommodate its position to that of the shaft or journal prevents its jumping or heating. At the same time the wedges F always retain a full bearing on the cheek-pieces, and the rods by which the wedges are raised or lowered are free to assume a natural position, while the nut by which they are operated has a full bearing-surface irrespective of the position of the rods.

We claim—

1. In bearings for the journals or shafts of steam-engines and other machinery, the cheek-pieces G G, having laterally-curved inclined surfaces at each end, in combination with correspondingly-curved adjustable wedges for changing the direction of the axis of the bearing in the horizontal plane, substantially as described.

2. In bearings for the journals or shafts of steam-engines and other machinery, the cheek-pieces G G, having laterally-curved inclined surfaces at each end, wedges having complementally curved and inclined faces in contact therewith, adjusting-rods for such wedges, and nuts and washers applied thereto, said washers having curved faces to fit into correspondingly-shaped bearings, substantially as described.

3. As an adjustable shaft and journal bearing, the combination of the lower or main bearing curved on its under or outer surface and capable of adjustment on a correspondingly-curved bed, two side bearings or cheek-pieces with inclined surfaces at both ends, and wedge-pieces capable of adjustment so as to change the direction of the axial line of the bearing to coincide with the direction of the axis of the shaft, substantially as described.

4. The combination of the frame A, curved bed M, upper bearing I, lower bearing H, having correspondingly-curved exterior surface, cheek-pieces G G, with inclined bearing-faces at each end, wedges F F, with correspondingly-formed faces and furnished with adjusting-rods C C, and a nut with a washer having cupped bearing-surface, substantially as and for the purposes described.

In testimony whereof we have hereunto set our hands this 9th day of July, A. D. 1889.

SEWARD S. BABBITT.
READE W. BAILEY.

Witnesses:
W. B. CORWIN,
JNO. K. SMITH.